(12) United States Patent
Grayson et al.

(10) Patent No.: US 10,722,334 B2
(45) Date of Patent: Jul. 28, 2020

(54) ENDODONTIC DEVICES

(71) Applicant: Tom C. Pagonis, Chestnut Hill, MA (US)

(72) Inventors: Ian Grayson, Boston, MA (US); Tom C. Pagonis, Chestnut Hill, MA (US)

(73) Assignee: Tom C. Pagonis, Chestnut Hill, MA (US)

( * ) Notice: Subject to any disclaimer, the term of this patent is extended or adjusted under 35 U.S.C. 154(b) by 192 days.

(21) Appl. No.: 15/892,134

(22) Filed: Feb. 8, 2018

(65) Prior Publication Data

US 2018/0228585 A1  Aug. 16, 2018

Related U.S. Application Data

(63) Continuation of application No. PCT/US2016/046150, filed on Aug. 9, 2016.

(60) Provisional application No. 62/203,250, filed on Aug. 10, 2015.

(51) Int. Cl.
*A61C 19/00* (2006.01)
*A61C 19/04* (2006.01)
*A61C 5/42* (2017.01)
*A61C 1/08* (2006.01)

(52) U.S. Cl.
CPC .......... *A61C 19/041* (2013.01); *A61C 1/082* (2013.01); *A61C 5/42* (2017.02); *A61C 19/042* (2013.01)

(58) Field of Classification Search
CPC ......... A61C 19/041; A61C 5/42; A61C 1/082; A61C 19/042; A61C 3/00; A61C 19/00; A61C 5/00
See application file for complete search history.

(56) References Cited

U.S. PATENT DOCUMENTS

| 2007/0009850 A1* | 1/2007 | Riitano | A61C 5/42 433/102 |
|---|---|---|---|
| 2007/0190487 A1 | 8/2007 | Pollock et al. | |
| 2009/0148810 A1 | 6/2009 | Maxwell et al. | |
| 2011/0229839 A1 | 9/2011 | Yamashita et al. | |
| 2011/0300512 A1 | 12/2011 | Becker et al. | |
| 2012/0088207 A1 | 4/2012 | Berkovich et al. | |
| 2012/0178287 A1 | 7/2012 | Mantay et al. | |
| 2016/0015478 A1* | 1/2016 | Jolesz | A61B 8/0875 433/27 |

OTHER PUBLICATIONS

International Search Report and Written Opinion for PCT/US16/46150 dated Dec. 16, 2016, pp. 1-11.

* cited by examiner

*Primary Examiner* — Nicholas D Lucchesi
(74) *Attorney, Agent, or Firm* — McCarter & English, LLP; Jonathan M. Sparks

(57) ABSTRACT

A device for measuring the length of a root canal of a subject is provided. The device includes a flexible sheath slidable over a dental handpiece head. The sheath includes electrically conducting wires for connecting to an apex locator. Also provided is a device for measuring root canal length that includes an endodontic file having a metallic element at the file end far from the end inserted into a root canal. The modified file provides a region in the metallic element for electronic attachment to an apex locator such that the rubber stopper may be moved along the entire file surface without interference.

14 Claims, 3 Drawing Sheets

ENDODONTIC DEVICES

RELATED APPLICATIONS

This application is a continuation of International Application No. PCT/US2016/046150 entitled "ENDODONTIC DEVICES," filed on Aug. 9, 2016, the content of which is hereby incorporated by reference in its entirety. International Application No. PCT/US2016/046150 claims priority to U.S. Provisional Patent Application Ser. No. 62/203,250 entitled "ENDODONTIC DEVICES," filed on Aug. 10, 2015, the content of which is hereby incorporated by reference in its entirety.

FIELD OF INVENTION

The present disclosure relates to improved endodontic devices for determining the location of the apex of a tooth and the length of a root canal of a subject.

BACKGROUND

An endodontic hand file used in clinical endodontic practice typically is a stainless steel or nickel titanium file attached to a plastic handle with a moveable rubber stopper. The rubber stopper is used for measuring the length of a root canal by aligning it with a reproducible landmark on the tooth. The rubber stopper is pierced through the metal portion of the file. Once the file is placed in a canal and moved to the very end/tip/apex of the root canal, the rubber stopper is moved to a tooth reference point which can then be measured on a small hand rule. Length verification can be done with a radiograph (x-ray). With the advent of an electronic apex locator, a clip is attached to the metal portion of the file and the clip is connected by a wire to the electronic apex locator which provides a read out as the file is moved toward the apex of the root canal. A second patient "lip" click is also used to complete a circuit. Once the device registers the proper length, the rubber stopper is adjusted to the tooth reference point. The clip is then removed and the entire file is withdrawn from canal length and measured on a small hand ruler, thus establishing the working length for that particular canal.

While the endodontic instruments currently known, in which an endodontic file is used in conjunction with an electronic apex locator, are helpful in determining a tooth root canal length, they have several limitations.

SUMMARY

Exemplary embodiments of the present technology are directed to an endodontic device for determining the apex of a root canal, using a standard dental handpiece with a rotary file within the handpiece. The device includes a readily sterilizable or disposable connector that is exemplified as a flexible sheath that can slide over a dental handpiece head. The sheath includes electrically conducting wires for connecting to an apex locator. The sheath may be completely removed for sterilization. The device includes an endodontic file, and unlike prior art devices, allows for determination of the apex using a standard dental handpiece. Further, even if the rubber stopper of the endodontic file is displaced, the position in the canal remains known since the position of the file is displayed on the screen of the apex locator. Embodiments of the present invention are also directed to another device for measuring the root canal length, which includes an endodontic file configured to connect to an apex locator in such a way that the rubber stopper of the file may be moved freely along the entire length of the file without interference.

In accordance with an aspect of the present disclosure, a device for determining the apex of a root canal or determining the distance between the apex of a tooth of a subject and the distal end of an endodontic file used in an endodontic procedure is provided. The device attaches to an endodontic file having a proximal end and a distal end, such that the proximal end is detachably inserted into a dental handpiece head and the distal end is insertable into a root canal of a subject and includes a flexible sheath surrounding the handpiece head, the sheath including a flexible electrically conducting member for connecting the file to an apex locator, and an electrically conducting first wire configured for connecting to the apex locator; such that upon insertion of the file proximal end into the handpiece head, electrical contact is made between the file proximal end and the flexible member, and between the flexible member and the first wire; such that the device may be operated to allow a user to determine the distance between the apex of the tooth of the subject and the distal end of the file. In one embodiment, the subject is a human.

Embodiments of the above exemplary device for obtaining a measure of the distance between the apex of the tooth and the distal end of the file can include one or more of the following features. In some embodiments, the first wire includes a first end and a second end, such that the wire passes through the flexible sheath, and such that the first end of the wire is disposed proximal to the flexible member and the second end is configured for connecting to the apex locator. In various embodiments, upon insertion of the file proximal end into the handpiece head, the flexible member makes electric contact with the first end of the first wire. In one embodiment, the second end of the first wire includes a first connector that detachably connects to a second connector provided at a first end of a second wire, such that a second end of the second wire is connected to the apex locator. In another embodiment, the flexible sheath is slidable over the handpiece head. In a related embodiment, the flexible sheath surrounds the handpiece head in a close fit. In one embodiment, the flexible electrically conducting member is spring loaded and contacts the first end of the first wire only when pushed by the file proximal end as the file is inserted into the handpiece head. In a related embodiment, the flexible member is a flap comprising electrically conducting wires. In various embodiments, the handpiece is an endodontic rotary handpiece. In one embodiment, the sheath is made of autoclavable plastic. In one embodiment, the sheath is a universal fit for all dental handpiece heads commonly in use. In one embodiment, the device yields root canal length measurement while in operation. In one embodiment, the apex locator is further electrically connected to the subject's body. For example, the device contains a clip that is connected to the subject's lip.

In accordance with another aspect of the present disclosure, further disclosed is a device for measuring the length of a root canal. The device includes: an endodontic file having a proximal end, a distal end, and a slidable stopper; such that the proximal end of the file includes a metallic element and the distal end is insertable into the root canal; such that the metallic element is configured to accept a first end of a wire, such that a second end of the wire is connected to an apex locator; and such that the rubber stopper may be moved freely along the length of the file.

Embodiments of the above device can include one or more of the following features. In one embodiment, the proximal end of the file is detachably connected to the apex locator. In some embodiments, the metallic element includes a knob. In one embodiment, the first end of the wire includes a connector element for attaching to the metallic element of the file proximal end. In a related embodiment, the connector element is a clip of the apex locator.

The exemplary devices of the present disclosure provide several advantages. For example, a device disclosed herein yields a measure of the distance between the apex of the tooth and the distal end of the file on a standard dental hand piece, thereby eliminating the need for a secondary device to determine the location of the apex. This measure can be obtained while the device is in operation Further, a device disclosed herein does not require a rubber stopper on the endodontic file for defining the length of the root canal. Also, in a device disclosed herein for measuring the length of a root canal using an endodontic file and an apex locator, the rubber stopper of the file may be moved freely along the length of the file without interference from any other component or accessory, such as a clip of the apex locator.

BRIEF DESCRIPTION OF THE DRAWINGS

The foregoing and other features and advantages provided by the present disclosure will be more fully understood from the following description of exemplary embodiments when read together with the drawings in the accompanying Appendix A (two pages), in which:

FIG. 2 middle and bottom panels show the prior art endodontic fie modified with the addition of a metallic element that includes a knob (205) above the plastic handle (203). A region (206) is shown for connecting the file to the apex locator (207) through the wire (209).

The Appendix including the Figures are hereby incorporated herein by reference in its entirety.

DETAILED DESCRIPTION

Provided herein are exemplary embodiments directed to an endodontic device for allowing a dental professional to determine the location of the apex or the length of the root canal by connecting a standard rotary handpiece to an apex locator. The device is used in conjunction with an endodontic file attached to a dental handpiece. The handpiece is capable of revolving the file at a consistent speed (rpm). The device includes a readily sterilizable flexible sheath that can slide over the head of the dental handpiece. In one embodiment, the device links the file in the handpiece to an apex locator, and allows for determining the location of the apex as the file is moving within the root canal. Using the device, even if the rubber stopper of the endodontic file (typically used to mark a reference point on the file) is displaced, the position of the file in the canal remains known. The device is further described below with reference to FIG. 1.

Figure 1:
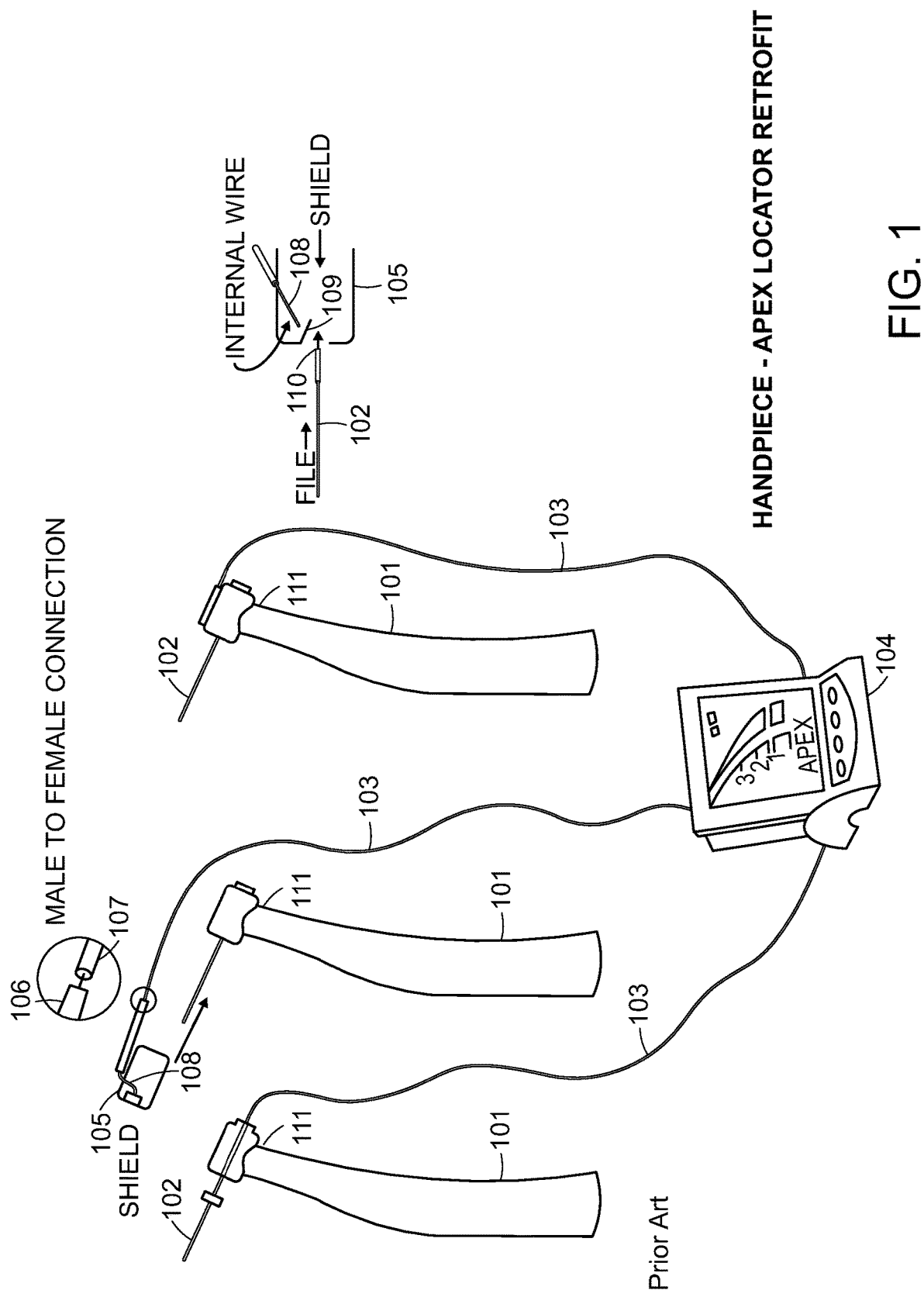
FIG. 1 shows a flexible sheath (105) that can easily slide over a dental handpiece head (111). The sheath contains an internal wire (extreme right) (108) configured for connecting to an apex locator (104).

FIG. 1 is a diagram showing a prior art device for measuring root canal length (left); an improvement according to the present technology, including a flexible sheath/shield (105) for sliding over a dental handpiece (101) head (111) (middle); and, an improved device having the flexible sheath (105) slid over the handpiece head (right). The Figure shows a first wire (108) passing through the flexible sheath (105). Also shown as part of the flexible sheath (105) is a flexible member (109). In the flexible sheath (105) one end of the first wire (108) is disposed proximal to the flexible member (109), and the other end is configured (106, 107) for connecting to an apex locator (104). In various embodiments of the device, upon insertion of the file (102) proximal end (110) into the handpiece head (111), the flexible member (109) makes electric contact with the end of the first wire proximal to the flexible member (109). The other end of the wire includes a first connector (106) that detachably connects to a second connector (107) provided at one end of a second wire (103). The other end of the second wire is connected to the apex locator (104). To the right the flexible sheath (105) is shown surrounding the headpiece in a close fit. The flexible sheath (105) is a universal fit for all commonly used dental handpiece heads.

The device, allows the user to determine the distance between the apex of the tooth and the distal end of the file, e.g., when the file is in the rotatory handpiece (101). In one embodiment, the flexible electrically conducting member (109) of the device may be spring loaded so as to contact the end of the first wire (108) only when pushed by the file proximal end (110) as the file (102) is inserted into the handpiece head (111). The flexible member (109) may be a flap having electrically conducting wires. The sheath (105) may be made of autoclavable plastic. The sheath may be sterilized by autoclaving after it is slid off the handpiece head (111) and disconnected from the wire (103) that connects it to the apex locator (104).

Figure 3:
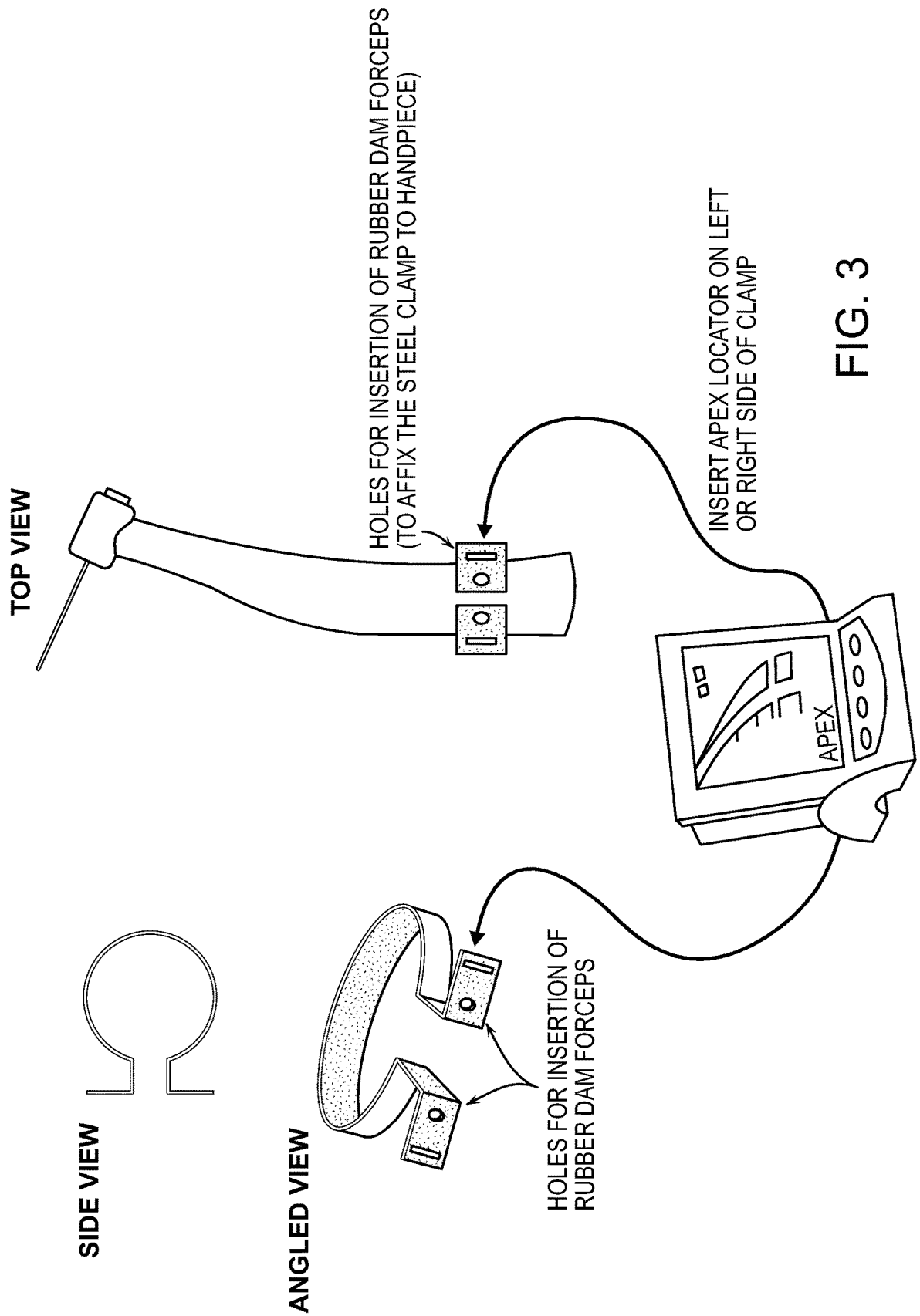
FIG. 3 sets forth an embodiment of the invention in which a clip attached to the rotary handpiece for the connection of an apex locating device.

In another embodiment, the first wire (108) may be operatively connected to the rotatory handpiece (101). In this embodiment, the handpiece (101) would be made out of a conductive material that allows for attachment of the apex locator to a location directly to the rotary handpiece (101). In exemplary embodiments, the connection may be through an attached fastener located on the handpiece (101) or through a clamp attached to the first wire (108). In another embodiment, only a portion of the handpiece would be made out of an appropriate material for connection of the first wire (108). This embodiment is exemplified in FIG. 3.

The apex locator as described herein is exemplified showing a wired connection between the device and apex locator. However, in alternate embodiments, the device may be connected to the apex locator (104) by a wireless connection such as WiFi or Bluetooth.

The device described herein can be used in connection with any number of commercially available apex locators. Exemplary apex locators include the Morita Root ZXII, the Formatron D-10 Apex Locator, or the Dentsply Ray-Pex5.

Embodiments of the present technology are directed also to another device for measuring root canal length, the device including an endodontic file configured to connect to an apex locator such that the rubber stopper of the file may be moved freely along the entire length of the exposed metal portion of the file without interference. The device is further described below with reference to FIG. 2.

Figure 2:
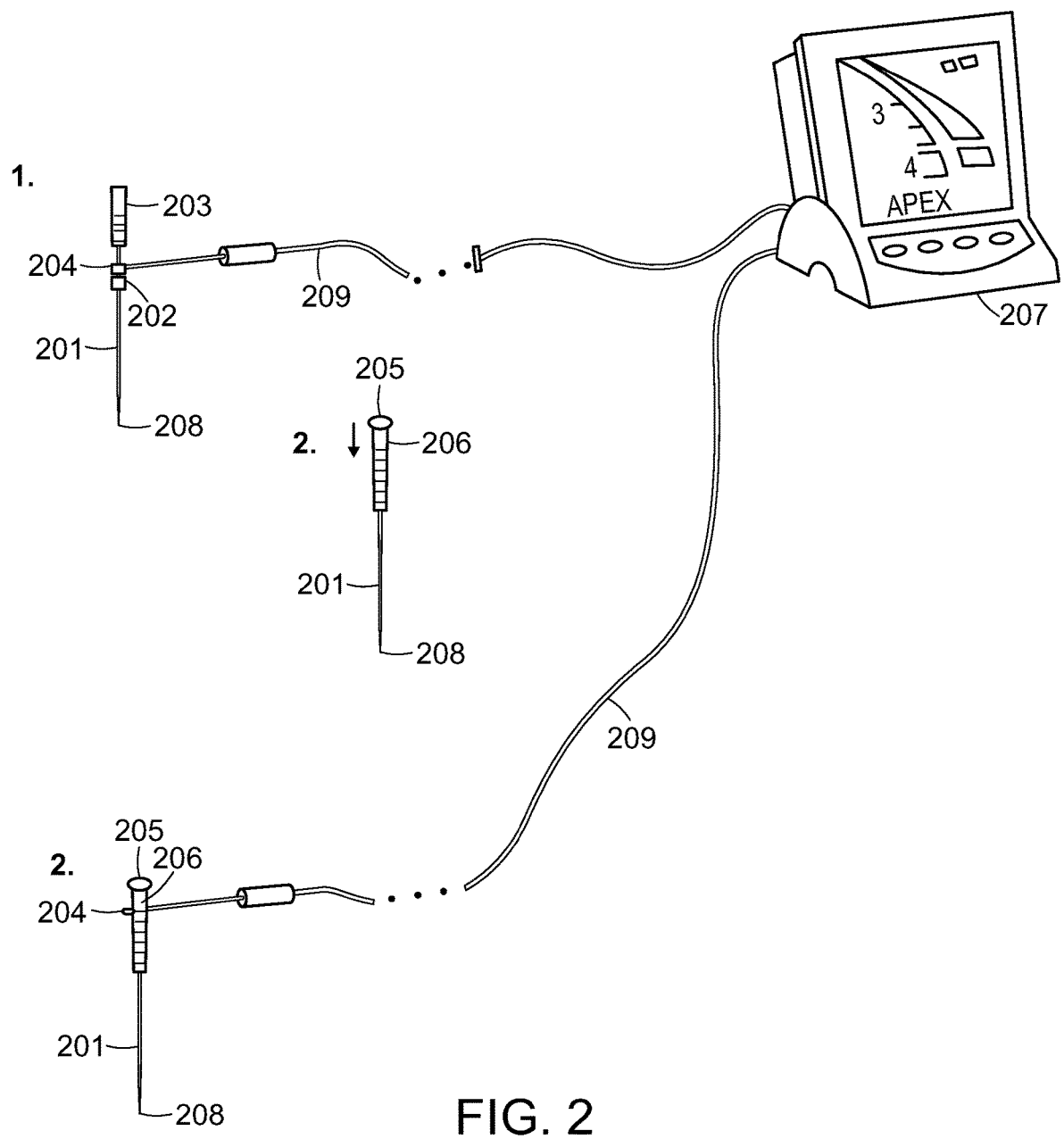
FIG. 2 top panel shows a prior art device for measuring root canal length. The device includes an endodontic file with a plastic handle (203), exposed metal portion (201), a rubber stopper (202), and a wire (209) connecting the file to an apex locator (207). The wire contacts a region of the file between the rubber stopper (202) and the plastic handle (203).

FIG. 2 top panel shows a prior art device for measuring root canal length. Included in the device is an endodontic file with a plastic handle (203), having an exposed metal portion (201), a rubber stopper (202), and a wire (209) for connecting the file to an apex locator (207). The wire contacts a region of the file between the rubber stopper (202) and the plastic handle (203). FIG. 2 middle and bottom panels show an improvement according to the present technology made to the prior art endodontic file. The prior art endodontic file is modified with the addition of a metallic element to the plastic handle (203). In the embodiment shown in the Figure, the metallic element includes a knob (205). The improvement provides a region (206) between the knob (205) and the plastic handle (203) such that the rubber stopper (not shown) may be moved along the exposed portion (201) of the file without interference from the connection to the apex locator. The knob (205) is configured to accept a first end of the wire (209). The second end of the wire is connected to the apex locator (207). Also shown in the FIG. 2 is a connector element (204) at the first end of the wire (209) for attaching to the metallic element at the file proximal end. The connector element may be a clip.

While exemplary embodiments have been described herein, it is expressly noted that these embodiments should not be construed as limiting, but rather that additions and modifications to what is expressly described herein also are included within the scope of the invention. Moreover, it is to be understood that many of the features of the various embodiments are not mutually exclusive, and can exist in various combinations and permutations, even if such combinations or permutations are not made express herein, without departing from the spirit and scope of the technology.

What is claimed is:

1. An device for connecting an endodontic file located within a dental handpiece to an apex locator comprising:
    a connector for a dental handpiece head, wherein the dental handpiece comprises an endodontic file having a proximal end and a distal end, wherein the proximal end is detachably inserted into the dental handpiece head and the distal end is insertable into a root canal of a subject;
    the connector comprising a flexible electrically conducting member for connecting the file to an apex locator, and an electrically conducting first wire configured for connecting to the apex locator, wherein the flexible electrically conducting member is spring loaded and contacts a first end of the first wire only when pushed by the file proximal end as the file is inserted into the handpiece head;
    wherein upon insertion of the file proximal end into the handpiece head, electrical contact is made between the file proximal end and the flexible member, and between the flexible member and the first wire; and
    wherein the device when connected to the apex locator allows for determining the location of an apex of the tooth.

2. The device of claim 1, wherein the connector comprises a flexible sheath.

3. The device of claim 2, wherein the first wire comprises the first end and a second end, wherein the wire passes through the flexible sheath, and wherein the first end of the wire is disposed proximal to the flexible member and the second end is configured for connecting to the apex locator.

4. The device of claim 3, wherein upon insertion of the file proximal end into the handpiece head, the flexible member makes electric contact with the first end of the first wire.

5. The device of claim 4, wherein the second end of the first wire comprises a first connector that detachably connects to a second connector provided at a first end of a second wire, wherein a second end of the second wire is connected to the apex locator.

6. The device of claim 2, wherein the flexible sheath is slidable over the handpiece head.

7. The device of claim 2, wherein the sheath is made of autoclavable plastic.

8. The device of claim 2, wherein the sheath is a universal fit for all dental handpiece heads commonly in use.

9. The device of claim 1, wherein the device, while in operation and connected to the apex locator, provides a continuous readout of the position of the distal end of the file relative to the apex of the tooth.

10. The device of claim 1, wherein the flexible member is a flap comprising electrically conducting wires.

11. The device of claim 1, wherein the handpiece is an endodontic rotary handpiece.

12. The device of claim 1, wherein the device yields root canal length measurement while in operation and connected to the apex locator.

13. The device of claim 1, wherein the apex locator is further connected to the subject's body.

14. The device of claim 1, wherein the apex locator is further connected to the subject's lip.

* * * * *